United States Patent
Dixon et al.

[11] 3,877,052
[45] Apr. 8, 1975

[54] LIGHT-EMITTING SEMICONDUCTOR APPARATUS FOR OPTICAL FIBERS

[75] Inventors: Richard Wayne Dixon, Morristown; William Baxter Joyce, Basking Ridge; Daniel Leon Rode, Murray Hill, all of N.J.

[73] Assignee: Bell Telephone Laboratories, Incorporated, Murray Hill, N.J.

[22] Filed: Dec. 26, 1973

[21] Appl. No.: 427,785

[52] U.S. Cl. .................. 357/17; 357/18; 357/16; 357/52
[51] Int. Cl. ............................................ H05b 33/00
[58] Field of Search.... 317/235 N, 239 AC; 357/17, 357/18, 16, 52

[56] References Cited
UNITED STATES PATENTS

| | | | |
|---|---|---|---|
| 3,283,207 | 11/1966 | Klein | 315/326 |
| 3,667,007 | 5/1972 | Kressel | 317/235 R |
| 3,703,670 | 11/1972 | Kunz | 317/235 R |
| 3,739,217 | 6/1973 | Bergh | 313/108 R |
| 3,790,868 | 10/1972 | Soshea | 317/235 R |

OTHER PUBLICATIONS

Alferov et al., Soviet Physics–Semiconductors, Vol. 3, No. 9, March 1970.

*Primary Examiner*—Martin H. Edlow
*Attorney, Agent, or Firm*—D. I. Caplan

[57] ABSTRACT

A semiconductor light-emitting diode (LED), which is substantially transparent to its own generated radiation, is coated with a reflecting layer having an exit aperture for transmission of optical radiation, for example, to an optical fiber. The reflecting layer includes a layer of dielectric in contact with the semiconductor, the dielectric layer itself being coated with an optically reflecting metal layer. The dielectric layer is made sufficiently thick to prevent the evanescent waves (of the totally internally reflected light in the semiconductor) from contacting the metal, thereby affording very close to 100 percent optical reflection of the optical rays in the semiconductor which are incident on the dielectric at greater than the critical angle. In addition, a significant portion of the semiconductor-dielectric interface is rough, thereby scattering (randomizing) the totally internally reflected rays in the semiconductor, which rays otherwise would have no chance of being accepted into the optical fiber. Thus, the overall coupling efficiency of optical radiation from the diode to the optical fiber is enhanced.

11 Claims, 2 Drawing Figures

LIGHT-EMITTING SEMICONDUCTOR APPARATUS FOR OPTICAL FIBERS

FIELD OF THE INVENTION

This invention relates to the field of semiconductor apparatus, and more particularly to electroluminescent semiconductor apparatus.

BACKGROUND OF THE INVENTION

When a semiconductor light-emitting diode (LED) is used as the source of optical radiation for an optical fiber, one problem which arises is the limited proportion of radiation being generated in the diode cavity which can enter the optical fiber, i.e., only that portion of radiation in the cavity lying within the acceptance angle of the fiber. By acceptance angle is meant, in the ray picture of optical theory, the maximum angle with respect to the normal to the axis of the fiber at which rays of light associated with any optical mode can enter and propagate through the fiber. This problem is similar to that treated in U.S. Pat. No. 3,739,217, issued to A. A. Bergh and R. H. Saul on June 12, 1973, except that in the present instance there is the additional problem of concentrating the rays of light in the electroluminescent diode cavity for acceptance at the relatively limited cross-sectional area of the entrance port (aperture) of the optical fiber relative to the total boundary wall surface area of the diode cavity itself. Thus, in one aspect, it appears that this present problem of coupling the radiation from an electroluminescent diode into an optical fiber runs up against limitations imposed by the second principle of thermodynamics, involving the upper limitations on the efficiency of passively coupling a substantial portion of the light in an optical source cavity through a small port by means of any number of intermediate passive elements such as lenses, filters, reflectors or cavities. However, this well-known limitation of the second principle of thermodynamics is implicitly premised upon sources which are opaque to their own radiation and upon closed systems (absent external power sources), and thus does not necessarily constitute an insurmountable theoretical barrier against solving the present problem of efficiently coupling the optical radiation of an LED into an optical fiber.

SUMMARY OF THE INVENTION

In order to increase the optical radiation which can be coupled into an optical fiber from a transparent electroluminescent semiconductor diode cavity, the diode cavity is coated with an optically reflecting layer having apertures for electrode contacts and for the insertion of the optical fiber. The reflecting layer includes a dielectric layer coated with an optically reflecting layer, typically a metal layer. A portion of the dielectric-semiconductor interface is made sufficiently rough to scatter (randomize) the totally internally reflected rays in the semiconductor, in order to give these rays another opportunity for acceptance into the entrance port of the optical fiber. The dielectric layer is advantageously sufficiently thick to prevent evanescent waves (leaking away from totally internally reflected light in the semiconductor) from contacting and being absorbed by the metal layer. The metallic reflecting layer on the dielectric serves the function of reflecting the nontotally internally reflected rays emanating from the semiconductor body back into the semiconductor body, in order to increase the opportunities for acceptance of these rays into the optical fiber. Thereby, by increasing the opportunities for acceptance of light rays into the fiber from the LED, the coupling efficiency is correspondingly increased.

In a specific embodiment of the invention, an LED includes a triple-layered monocrystalline semiconductor structure, including a crystal layer of P-type gallium aluminum arsenide, an intermediate crystal layer of P-type (or N-type in the alternative) gallium arsenide, and a crystal layer of N-type gallium aluminum arsenide. The intermediate P-type (or N-type) gallium arsenide layer is sandwiched between the p- and N-type gallium aluminum arsenide layers. Thereby, the triple-layer semiconductor crystal forms an optical radiation cavity. A significant portion of the boundary surface of the crystal is made optically rough for providing the randomizing type of optical reflections desirable in this invention. Advantageously, the roughness is such that the "characteristic roughness dimension" is at least one-tenth the wavelength, preferably at least the wavelength itself. The "characteristic dimension" is that portion of the Fourier spatial transform of the surface which includes most of the significant component amplitudes. Such techniques as liquid honing, sandblasting or grinding can be used to obtain such a characteristic roughness dimension. A dielectric layer, such as silicon dioxide, coats the entire boundary surface of the semiconductor crystal (including the rough portion) except for apertures at locations for electrical contact and for insertion of the optical fiber. A pair of optically reflecting metallic silver layers coat the entire dielectric layer (except for spaces for the insertion of the optical fiber and for mutual electrical isolation) and make direct physical contact with the semiconductor through apertures in the dielectric layer. The silicon dioxide and the silver layers furnish the desired optically reflecting layer for the semiconductor cavity, while the silver layers also function as electrode contacts to the semiconductor.

Advantageously, the P-type (or N-type) intermediate gallium arsenide layer is comparatively very thin, in order to minimize absorption of the light previously emitted at this intermediate layer while this light subsequently undergoes multiple reflections at the reflecting layer and is thereby directed back through this layer. Since the energy bandgaps of the outer P- and N-type layers are greater than that of the intermediate gallium arsenide layer, absorption will be insignificant in these outer layers with respect to light previously emitted at the intermediate layer while undergoing the subsequent multiple reflections.

Figure 1:
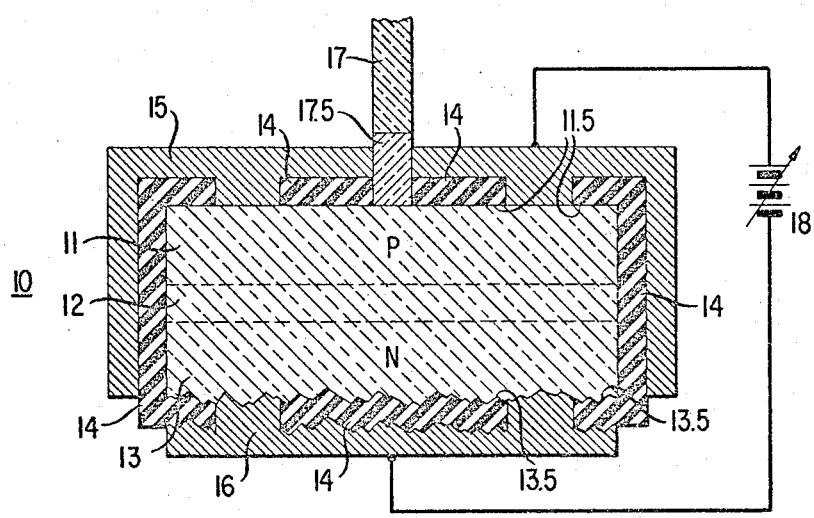
FIG. 1 is a side view in cross section of an electroluminescent diode apparatus, with coupling into an optical fiber, in accordance with a specific embodiment of the invention.

For the sake of clarity only, none of the Figures is drawn to any scale.

DETAILED DESCRIPTION OF THE DRAWING

FIG. 1 shows an electroluminescent diode 10 including a P-type outer layer 11 of semiconductive gallium aluminum arsenide, a P-type (alternatively N-type) intermediate layer 12 of semiconductive gallium arsenide, and an N-type outer layer 13 of semiconductive gallium aluminum arsenide. It should be understood, however, that for ease of fabrication, the intermediate layer 12 can be gallium aluminum arsenide also, but with a concentration of aluminum which is significantly less than that in the outer layers 11 and 13. The semiconductive layers 11, 12 and 13 are typically fabricated according to known techniques of epitaxial semiconductor crystalline growth, such as described by B. I. Miller, E. Pinkas, I. Hayashi, and R. J. Capik in a paper entitled "Reproducible Liquid Phase Epitaxial Growth of Double Heterostructure GaAs-Al$_x$Ga$_{1-x}$As Laser Diode," Journ. Appl. Phys. 43, No. 6, pp. 2817–2826 (June 1972). The layer 11 is P-type by reason of doping with excess acceptor impurities ("holes") in a concentration typically between about $1\times10^{17}$ and about $1\times10^{18}$ per cubic centimeter. The P-type (or N-type) layer 12 contains a concentration of acceptor (or donor) impurties of about $4\times10^{17}$ per cubic centimeter. The N-type layer 13 contains excess significant donor impurities typically in a concentration of between about $1\times10^{17}$ and $1\times10^{18}$ per cubic centimeter.

The relative atomic proportion of gallium to aluminum in the outer layers 11 and 13 typically is in a range between about nine and two, typically about three. In any event, it is important that the relative proportion of aluminum be sufficient in these outer layers, in order to ensure that the forbidden energy bandgap in the layers 11 and 13 be significantly higher than the energy bandgap in the layer 12. Thereby, the layers 11 and 13 will be relatively transparent to radiation generated in the layer 12, so that the absorption of radiation even by the relatively thick outer layers 11 and 13 is minimal, by reason of this energy bandgap difference. The cross sections of the layers 11, 12 and 13 are typically rectangular, as obtained by scribing and breaking or laser-milling of an initially much larger slice of semiconductor. The thicknesses of the layers 11, 12 and 13 are typically about 2, 0.5 and 2 micrometers, respectively; whereas the cross sections of these layers are both typically about 125 micrometers square. In any event, it is important that the thickness of the layer 12 be sufficiently small so that there will be only minimal absorption by this layer of the radiation generated therein by the recombination processes of electrons and holes in response to forward voltage applied across the P-type layer 11 and the N-type layer 13. Thus, in all of the semiconductor material in the device 10, there will be minimal radiation absorption in the optical radiation cavity formed by the semiconductor layers 11, 12 and 13. This cavity has boundary walls which are coated with an optical reflector layer comprising a dielectric layer 14 and metal layers 15 and 16 to be described presently.

The dielectric layer 14 is typically a silicon dioxide layer advantageously at least 1,000 angstroms in thickness, to enable considerable exponential "decay" of any evanescent optical waves therein coming from the semiconductor cavity formed by the semiconductor layers 11, 12 and 13. This dielectric layer has apertures for the insertion of an optical fiber 17 and for direct physical contact of metal layers 15 and 16 serving simultaneously as electrodes as well as reflectors of the optical radiation coming from the semiconductor cavity through the dielectric layer 14. It should be noted, however, that ordinarily at the surface of electrode contact of the metal layers 15 and 16 with the semiconductor material of the cavity, these metal layers will be darkened; hence these metal layers are optically absorbing rather than reflecting at the semiconductor contact areas, due to alloying of metal with the semiconductor at the elevated temperature treatments ordinarily used for providing good electrical (alloy) contact. To reduce the nonreflecting areas of contact, but at the same time maintain good and reliable electrical contact of metal, these areas of contact are advantageously made in the form of a plurality of tiny circular (multiple dot) contacts through corresponding cylindrical apertures in the dielectric, as disclosed in U.S. Pat. No. 3,667,004 issued to M. Kuhn and N. E. Schumaker on May 30, 1972. The metal in the (optically reflecting-electrode) layers 15 and 16 is typically silver, but gold or aluminum can also be used for these layers. Thus, an optical radiation cavity with reflecting walls is formed by the semiconductor layers 11, 12 and 13 coated with the dielectric layer 14 and the metal layers 15 and 16.

It should be understood that those optical rays in the cavity which are incident on the top surface 11.5 (or bottom surface 13.5) of the semiconductor cavity at angles greater than the critical angle are reflected by the dielectric layer 14 with an efficiency of close to 100 percent, whereas those rays which are incident on the surface 11.5 (or 13.5) at angles less than the critical angle are reflected by the metal layer 15 (or 16) with a loss of the order of 5 percent to 20 percent.

The bottom surface 13.5 of the semiconductor cavity material in the layer 13 advantageously is roughened in order to provide suitable scattering of radiation. For the purpose of an appreciable influence in randomizing the angular distribution of the propagation direction of light rays propagating in various modes in the radiation cavity (formed by the semiconductor body with its optically reflecting layers 14 and 15), the surface irregularities of the bottom surface 13.5 should possess maximum angular deviations from a flat plane of at least an angle of about 20°; and these surface irregularities should extend over a significant fraction of the bottom surface 13.5, at least greater than 30 percent, and advantageously the whole of said bottom surface 13.5. Thus, for example, the entire bottom surface 13.5 can be made rough by such techniques as sandblasting, liquid honing or grinding to a diffuse reflecting surface. Alternatively, the top surface 11.5 of the layer 11 can be roughened instead of or in addition to the roughening of the bottom surface 13.5. In any event, a significant portion of the walls of the radiation cavity is characterized by significantly randomizing optical reflectivity.

Through an exit port (aperture) in the dielectric layer 14, aligned with a similar aperture in the metal layer 15, the optical fiber 17 is inserted either directly in contact with the P-type layer 11 or preferably, as shown in FIG. 1, with an optically coupling material 17.5 located between the optical fiber 17 and the semiconductor layer 11. Typically, this optically coupling material can be suitable oils or resins as known in the art, while the optical fiber 17 can be fused silica or quartz. Alternatively, part of all of the coupling material can be formed by the dielectric layer 14 already situated at this exit port. A battery 18 of suitable polarity is connected across the metal reflecting layers 15 and 16 to complete the circuit, thereby to provide forward voltage potential to the P-type layer 11 with respect to the N-type layer 13 for the production of copious electrons and holes (which then recombine in layer 12 accompanied by the emission of optical radiation characterized by a vacuum wavelength of about 1 micron).

The coupling material 17.5 can be a single material as indicated in FIG. 1. Alternatively, this coupling material can be a multilayered dielectric which reflects those optical rays which are outside the acceptance back into the cavity and which transmits the other rays to the fiber 17 for propagation therethrough. In another alternative, a tiny lens may be located in an air gap between the fiber 17 and the cavity aperture, to redirect into the acceptance angle those optical rays which otherwise would not be accepted for propagation through the fiber.

It should be understood that in addition to, or instead of, the bottom surface 13.5 being optically rough, the side surfaces of the layers 11 and 13 can be roughened as well as the top surface 11.5 of the layer 11, in order to provide a (further) significant amount of suitable randomization of the propagating directions of the optical radiation being reflected in the semiconductor radiation cavity. Thereby, the probability of optical radiation being trapped in the cavity in modes which cannot be accepted by the fiber is significantly reduced, and thereby the overall coupling of radiation from cavity to fiber is enhanced.

Figure 2:
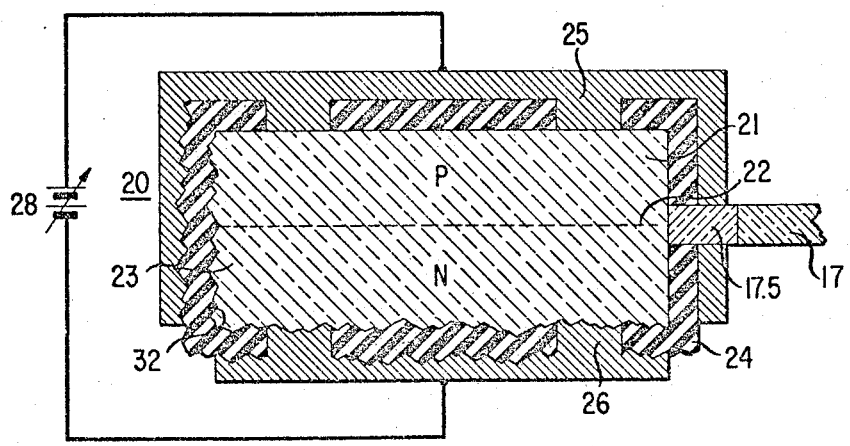
FIG. 2 is a side view in cross section of an electroluminescent diode apparatus, with coupling to an optical fiber whose axis is in the plane of the P-N junction of the diode, according to another specific embodiment of the invention.

FIG. 2 shows an alternate embodiment of this invention, which is similar to that shown in FIG. 1 except that the optical fiber 17 is inserted such that its axis is in the plane of a P-N junction 22 located between a P-type semiconductor 21 and an N-type semiconductor 23. To emphasize the similarities between FIGS. 1 and 2, the reference numerals in FIG. 2 are the same as for corresponding elements in FIG. 1 plus ten.

It should be noted that the P-type and N-type semiconductors 21 and 23 can both be gallium arsenide phosphide. A dielectric layer 24 and metal reflecting layers 25 and 26 (which also serve as electrodes), as shown in FIG. 2, are provided similarly to the equivalent elements in FIG. 1. The fiber 17 is aligned along the plane of the P-N junction 22, so that a greater fraction of the radiation entering the fiber will come directly from the P-N junction 22 without prior reflection(s) at the boundary walls of the semiconductor cavity. Although not essential, it is advantageous in this case that the side wall 32 of the layers 21 and 23 also be roughened, as indicated in FIG. 2.

Typically, the metal layers 15 and 16 (25 and 26) are made with a thickness of about 0.5 micron to 20 micron (or more for extraction of heat to a heat sink if desired).

It should be understood that in the devices shown in FIGS. 1 and 2 it is important that the dielectric constant of the semiconductor material be significantly greater (by at least a factor of about two) than that of the dielectric coating in order to furnish a relatively small critical angle in the semiconductor. It should be further understood that the electroluminescent semiconductor materials in the cavity should be characterized in that the materials therein will cause only an insignificant amount of optical absorption on each pass of the radiation from one boundary surface to another boundary surface through the semiconductor material in the cavity. Thus, for example, it is important that the atomic ratio of gallium to aluminum in gallium aluminum arsenide be less than about nine; and that in case of relative arsenide phosphide, the relative proportion of gallium phosphide to gallium arsenide should be at least 36 percent by weight. In general, therefore, the materials used for the layers 11 and 13 (or 21 and 23) should be transparent to the radiation being produced at the intermediate layer 12 (or P-N junction region 22). It is also important that the silicon dioxide layer 14 should be at least about a 1,000 angstroms thick or more, in order that the evanescent optical waves coming from the semiconductor material at the boundary with this dielectric layer should exponentially decrease to an insignificant value of intensity over this thickness. Such a thickness of silicon dioxide will provide sufficient space for an exponential decay of the intensity of the average ray above critical angle in the semiconductor to a value at the metal layer which is below about 25 percent of its value in the semiconductor. In this way there will be only minimal optical intensity present at the metal layers and hence only minimal absorption by these metal layers of the evanescent waves, while these metal layers will also provide optical reflection with high efficiency (low loss) of those rays which pass through the boundary surface of the dielectric semiconductor materials at angles less than the critical angles in accordance with geometrical optical principles. Thereby, there will be minimal net absorption of the radiation generated either in the intermediate layer 12 (FIG. 1) or in the P-N junction region 22 (FIG. 2) by either the respective semiconductor materials or by the reflecting layer provided by the combination of the dielectric layer and the metal layers. Thus, the optical radiation generated in the devices 10 and 20 will undergo minimal absorption therein and therefore have a greater probability of being accepted into the fiber on many "passes," that is, on many multiple reflections in the cavity formed by the semiconductor material coated by the reflecting layer.

It should be understood that as a consequence of the presence of the optical reflecting metal layers 15 and 16 (25 and 26), the intensity of radiation in the cavity traversing the layer 12 (junction 22) is thereby enhanced; but the second principle of thermodynamics is not thereby violated, by reason of the presence of the external battery, i.e., nonclosed system.

While this invention has been described in terms of specific embodiments, various modifications can be made without departing from the scope of this invention. For example, the dielectric layer 14 can be the native ("genetic") oxide of the semiconductor rather than silicon dioxide.

What is claimed is:

1. A light-emitting apparatus which comprises
   a. an electroluminescent semiconductor body, including at least one P-N junction and a pair of electrode contacts to said body for the application of electrical bias to the body for the generation of optical radiation in the body, a substantial portion of said body being substantially transparent to said radiation and at least a portion of the boundary surface of the body being rough, said portion of the surface being sufficient in area extent to scatter a significant portion of the optical radiation in the body;

b. a dielectric layer which coats the semiconductor body except for apertures for the insertion of electrode contacts to the body and except for at least one other aperture for the escape of optical radiation from the body through an exit port of the body, the thickness of the dielectric being sufficient to allow for the spatial decay over said thickness of the dielectric of those evanescent waves of light which are totally internally reflected at the boundary of the semiconductor body with the dielectric layer to an insignificant value of intensity, the refractive index of the dielectric being less than that of the semiconductor at the interface with said dielectiric; and c. a metal layer coating the dielectric layer, the metal layer being suitable for the reflection of light transmitted through the interface formed by the semiconductor body with the dielectric layer.

2. Apparatus according to claim 1 in which the semiconductor body contains an intermediate layer of gallium aluminum arsenide sandwiched between an outer layer of P-type gallium aluminum arsenide and an outer layer of N-type gallium aluminum arsenide, the proportion of aluminum to gallium in the P-type and the N-type outer layers being sufficient to render the P-type and N-type layers substantially transparent to the optical radiation generated in the intermediate gallium arsenide layer, and the proportion of aluminum to gallium in the intermediate layer being significantly less than in both of the outer layers.

3. Apparatus according to claim 1 in which the dielectric layer is essentially a silicon oxide type material.

4. Apparatus according to claim 1 which further includes electrical circuit means for providing a voltage to energize the electroluminescent semiconductor to generate optical radiation and which further includes an optical fiber having an entrance port located in proximity to the exit port of the semiconductor body whereby optical radiation generated in the body is coupled into the fiber.

5. An electroluminescent apparatus which comprises a. a body substantially of transparent semiconductor material; including means for generating optical radiation in the body;

b. a dielectric layer in physical contact with a substantial portion of the surface of the body, the thickness of the dielectric being sufficient to allow for the spatial decay over said thickness of the dielectric of those evanescent waves of light which are totally internally reflected in the body at the boundary of the body with the dielectric layer to an insignificant value of intensity; and c. a metal layer in physical contact with a substantial portion of the outer surface of the dielectric layer, the dielectric layer and the metal layer forming boundary walls for the optical radiation cavity formed by the body, in which at least a significant portion of the interface between the body and the dielectric is sufficiently rough for the randomization of the directions of propagation of optical rays generated in the body to enable said rays to be coupled through an exit port of the body in a significantly greater proportion than otherwise.

6. Apparatus according to claim 5 in which the refractive index of the dielectric is less than that of the body at the interface with the dielectric by a factor of at least two.

7. Apparatus according to claim 5 in which the dielectric is essentially silicon dioxide.

8. Apparatus according to claim 5 in which the dielectric is the native oxide of the body.

9. Apparatus according to claim 5 in which the metal layer has an aperture port for the coupling to an optical fiber of the optical radiation generated in the body in response to electricity applied to the body.

10. Apparatus according to claim 9 which further includes the optical fiber.

11. In combination, a. a body of semiconductor, including at least one P-N junction and a pair of electrode contacts to said body for the application of electrical bias to stimulate the generation of optical radiation in the body, whose external surface is surrounded by a first layer of dielectric material having a lower refractive index than that of the semiconductor, except for aperture portions of said surface for the insertion of electrodes and for the exit of optical radiation to at least one optical fiber; and b. a second layer coating the first layer suitable for the reflection of light transmitted through the first layer, at least a portion of the interface of the dielectric layer and the body being optically rough, the first layer being sufficiently thick for an exponential decay of intensity of evanescent waves emanating from the body towards the second layer to a value at the second layer which is on the average less than about 25 percent of its value in the body.

* * * * *

UNITED STATES PATENT OFFICE
CERTIFICATE OF CORRECTION

PATENT NO. : 3,877,052
DATED : April 8, 1975
INVENTOR(S) : Richard W. Dixon, William B. Joyce and Daniel L. Rode It is certified that error appears in the above-identified patent and that said Letters Patent are hereby corrected as shown below:

Column 6, line 7, "relative", first occurrence, should read --gallium--.

Signed and Sealed this twenty-ninth Day of July 1975

[SEAL]

Attest:

RUTH C. MASON
Attesting Officer

C. MARSHALL DANN
Commissioner of Patents and Trademarks